United States Patent [19]

Montgomery

[11] Patent Number: 4,876,450
[45] Date of Patent: Oct. 24, 1989

[54] CRYOSONDE FOR WELL LOGGING TOOL

[75] Inventor: Melvin G. Montgomery, Plano, Tex.

[73] Assignee: Atlantic Richfield Company, Los Angeles, Calif.

[21] Appl. No.: 224,511

[22] Filed: Jul. 26, 1988

[51] Int. Cl.$^4$ .............................................. G01V 5/00
[52] U.S. Cl. ..................................... 250/261; 62/260
[58] Field of Search ............... 250/253, 256, 258, 257, 250/254, 261; 62/260

[56] References Cited

U.S. PATENT DOCUMENTS

| 4,317,993 | 3/1982 | Hertzog et al. | 250/270 |
| 4,327,290 | 4/1982 | Plasek | 250/270 |
| 4,507,554 | 3/1988 | Hertzog et al. | 250/270 |

Primary Examiner—Janice A. Howell
Assistant Examiner—T. Nguyen
Attorney, Agent, or Firm—Drude Faulconer

[57] ABSTRACT

A cryosonde for a logging tool wherein the refrigerant chamber for cooling the germanium crystal detector has an easily replaceable rupture means which will fail before the chamber, itself, will rupture.

6 Claims, 2 Drawing Sheets

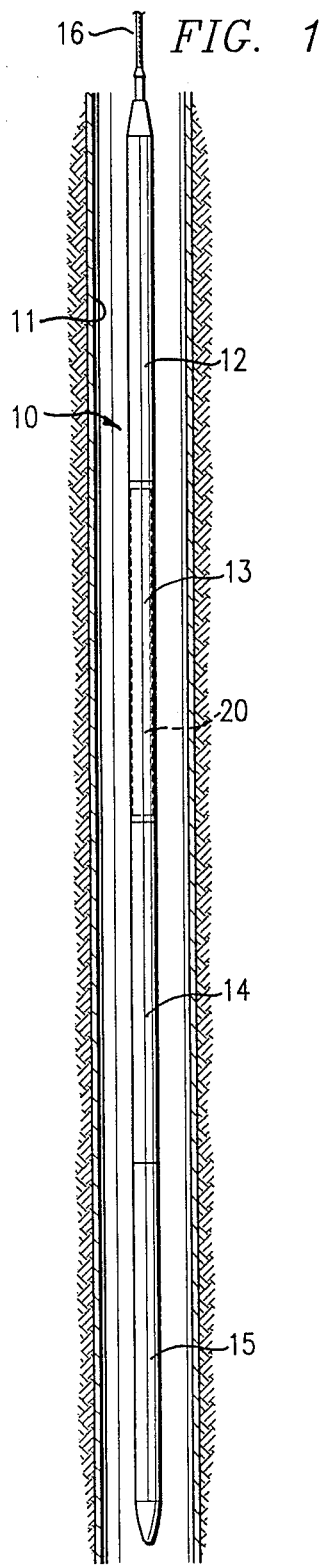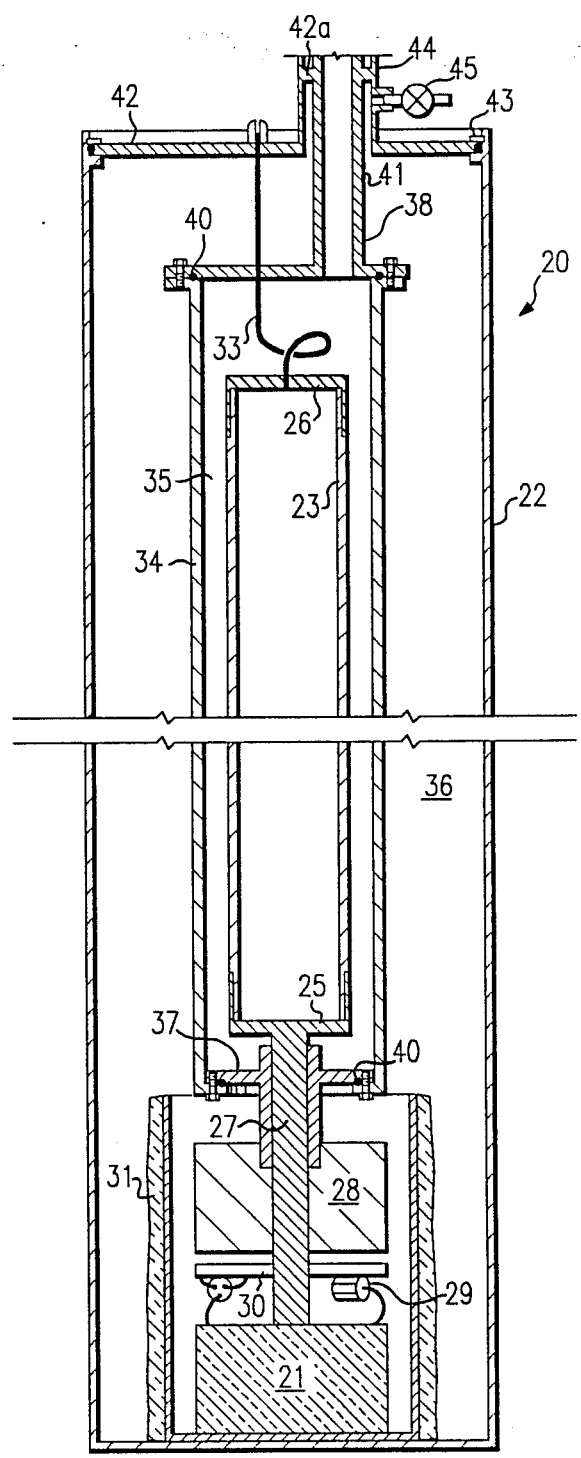
FIG. 1
FIG. 2
(PRIOR ART)

CRYOSONDE FOR WELL LOGGING TOOL

DESCRIPTION

1. Technical Field

The present invention relates to a cyrosonde for a well logging tool and in one of its preferred aspects relates to a cryosonde having a refrigerant chamber which has a rupture means which fails at a pressure less than the pressure required to rupture the chamber.

2. Background Art

Logging tools are available which are capable of running logs in wells which have been cased with steel casing. Such tools typically consist of a neutron generator for emitting neutrons and a detector for detecting the gamma-rays that are produced by collision or absorption of the neutrons with atoms in the surrounding environment, with primary interest in gamma-rays from the various formations lying behind the casing.

There are several different types of known detectors used in gamma-ray tools, e.g., Geiger-Mueller detectors, proportional counters, ionization chambers, scintillation detectors, etc. Recently, detectors have been developed which utilize a germanium crystal for detecting the reflected gamma-rays. However, a germanium crystal can only function when it is maintained at cryogenic temperatures; e.g., $= -135°$ C. To keep the crystal at such temperature, the crystal is positioned in a "cryosonde" which, in turn, is assembled into the logging tool.

A cryosonde has a refrigerant chamber which is filled with a refrigerant, e.g., freon, which, in turn, is frozen solid by a cryogenic liquid, e.g., liquid nitrogren. The chamber provides the cooling for the crystal for extended periods while the logging tool is in a well. Unfortunately, however, the freon eventually will melt and warm up causing pressure in the chamber to build. If the vent tube to the chamber becomes plugged with debris or the pressure buildup is too rapid, the chamber will rupture and will have to be replaced before the logging tool can be used again. This requires the cryosonde to be made in parts which can readily be disassembled to remove the damaged chamber. Since a vacuum is used in the cryosonde to insulate the freon chamber, seals must be provided between certain of the parts as the cryosonde is assembled. Since these seals are exposed to cryogenic temperatures, they often fail causing loss of the insulative vacuum which, in turn, can cause serious damage to the germanium crystal.

Obviously, a ruptured refrigerant chamber and/or loss of the insultative vacuum in a cryosonde result in a substantially shortened operational life and increased maintenance problems. Further, the replacement of a refrigerant chamber requires that the logging tool be taken out of service for an extended period resulting in substantial downtime and expense.

DISCLOSURE OF THE INVENTION

The present invention provides a cryosonde for a logging tool which includes protection against rupture of the refrigerant chamber and eliminates the need for the seals which often fail resulting in the loss of the insulative vacuum in the cryosonde.

More specifically, the cryosonde of the present invention is comprised of a housing which is adapted to be assembled into a well logging tool. A germanium crystal detector and a means for cooling the crystal to its operating temperature are positioned in the housing. The cooling means is comprised of a refrigerant chamber which cools the crystal through a copper rod which depends from the chamber into contact with the crystal.

A capillary tube is provided for filling the refrigerant chamber with refrigerant, e.g., freon, and for venting the chamber after the filling operation has been completed. A filter is positioned over the opening of the tube whereby all fluids flowing into or out of the chamber will be filtered therethrough thereby preventing debris from plugging the tube.

The cap which closes the upper end of the chamber has a rupture means thereon which is in fluid communication with the inteior of the chamber and which is adapted to rupture at a pressure which is less than the pressure required to rupture the chamber, itself. The rupture means is a removable plug having a bore therethrough which is normally closed by a replaceable, sealing membrane, e.g., aluminum foil. Any excessive buildup of pressure in the chamber will rupture the inexpensive and easily replaceable membrane thereby preventing damage to the more expensive and difficult to replace chamber.

Further, the cryosonde includes a sleeve in the housing which forms (1) a first annulus around the chamber and (2) a second insulative annulus around the first annulus, and a cryogenic filler tube therethrough by which a cryogenic liquid, e.g., liquid nitrogen, can be flowed to the first annulus to freeze the freon in the chamber. The second annulus is evacuated to provide insulation for the freon chamber.

The rupture means is positioned on the chamber so that it will lie directly in line with the filler tube and is easily accessible therethrough. This allows the rupture means to be quickly removed and replaced through the filler tube without requiring disassembly of the cryosonde. Accordingly, the component parts of the cryosonde can be permanently assembled, e.g., welded together, thereby eliminating the need for seals that can fail during operation of the cryosonde.

BRIEF DESCRIPTION OF THE DRAWINGS

The actual construction, operation, and apparent advantages of the present invention will be better understood by referring to the drawings in which like numerals identify like parts and in which:

FIG. 1 illustrates a typical logging tool in a wellbore;

FIG. 2 is a sectional view, partly broken away, of a prior art cryosonde;

BEST MODE FOR CARRYING OUT THE INVENTION

Figure 3:
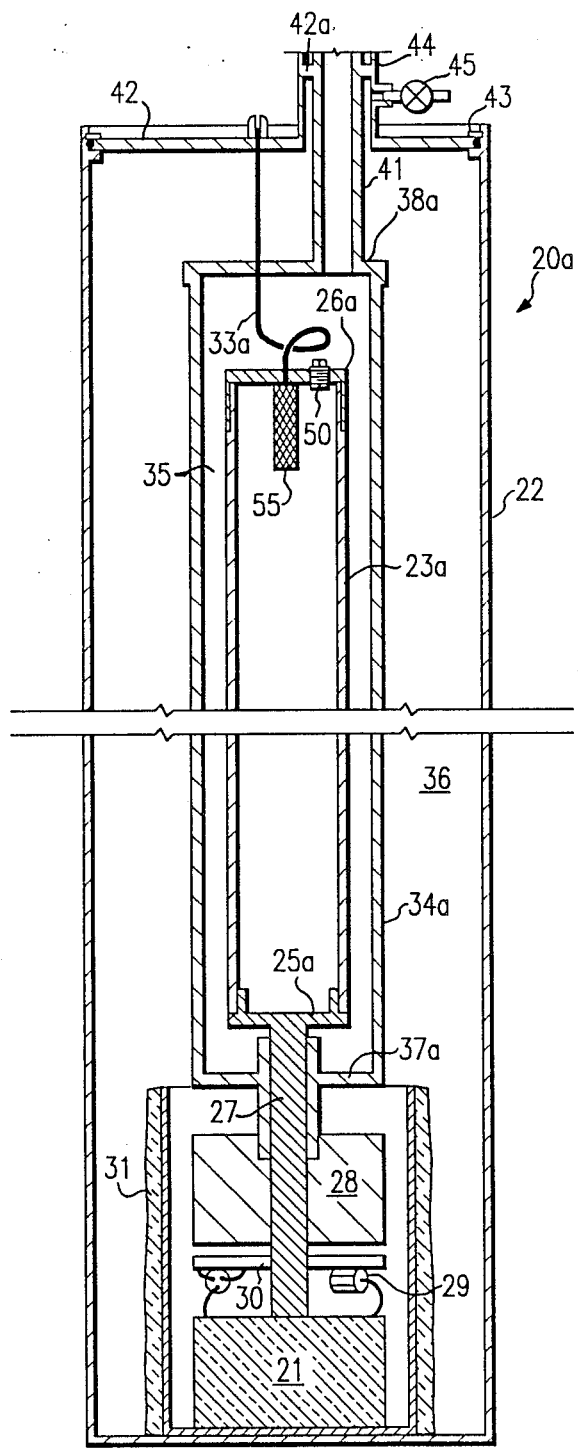
FIG. 3 is a sectional view, partly broken away of the cryosonde of the present invention.

Referring more specifically to the drawings, FIG. 1 illustrates a typical neutron logging tool 10 of the type used to run a "through the casing" log in cased well 11. Tool 10 is comprised of data electronic section 12, a detector section 13, a neutron generator section 14, and an electronic section 15 for driving the neutron generator. All of these sections are coupled together to form a unitary housing which, in turn, is suspended in well 11 on wireline 16.

As understood in the art, in logging well 11, tool 10 is raised in well 11, as the neutron generator in section 14 is actuated to emit neutrons which penetrate the casing in the well and the formations behind the casing. These neutrons produce gamma-rays by collision or absorption with atoms which are unique to a given atom type from the formations back through the casing and into well 11. The resulting gamma-rays are sensed by a detector 20 in section 13 which, in turn, transmits them to data section 12 where they are processed before being transmitted to the surface through wireline 16 for further processing into the desired log.

There are different types of detectors 20 which may be used in tool 10, one of which is commonly referred to as a "cryosonde". Cryosondes are well known and are commercially available, e.g., Model X-4 Sonde, Princeton Gamma Tech, Inc., Princeton, N.J. The details of such a prior art cryosonde 20 are illustrated in FIG. 2. Cryosonde 20 is comprised of a housing 22 (e.g., 2—⅜" O.D., 45" long, stainless steel cylinder) which is to be mounted within the housing of section 13 (FIG. 1). Positioned in the lower end of housing 22 is germanium crystal 21 which detects the gamma-rays as they are reflected by the various formations during the logging operation. As understood in the art, for the germanium to properly function, its temperature must be maintained at cyrogenic temperatures, e.g., $-135°$ C. or lower.

To provide the necessary cooling for crystal 21, refrigerant chamber 23 is positioned within housing 22 above the crystal. Chamber 23 is constructed from a good heat-conductive material (e.g., 1.9" O.D., 27" long cylinder of copper pipe) which has about 2 inches of the wall at each end machined down to about half of its original thickness. A copper bottom cap 25 with its wall the same thickness as that of the machined area of chamber 23 is fitted over the lower end of chamber 23 and is soldered or brazed thereon, thereby restoring the lower end of chamber 23 to its original thickness and strength. Bottom cap 25 must be of good heat conduction material, e.g., copper, as will become obvious below. However, it is difficult to completely bond the inner joint between chamber 23 and bottom copper cap 25 so a weak point exists which can easily rupture at half the pressure that it would otherwise take to rupture the rest of chamber 23. This problem is not as prominent with top cap 26 which is of stainless steel since its strength is much greater than that of copper.

Thermal communication between refrigerant chamber 23 and crystal 21 is provided by solid copper rod 27 which is integral with bottom cap 25 and which extends downward into contact with crystal 21. Sieve basket 28 (e.g., material similar to expanded clay having a high surface area) surrounds rod 27 and acts to attract and absorb any $CO_2$, water vapor, or the like that may be in the vicinity of crystal 21 to thereby protect the crystal from any damage that may be caused by the freezing of such vapors onto the crystal. Electronics, e.g., condensers 29, etc., related to the operation of crystal 21 are positioned on support 30 which, in turn, is positioned on rod 27, and are operated through leads (not shown for brevity). Both sieve basket 28 and crystal 21 are within an insulative enclosure 31 to prevent excessive heat gains by the crystal.

Refrigerant chamber 23 is filled with a refrigerant, e.g., freon, through capillary tube 33 (e.g., standard ⅛ stainless steel tubing) which also serves as a vent for chamber 23 during operation of tool 10. A sleeve 34 surrounds chamber 23 to form (1) a first annulus 35 between chamber 23 and sleeve 34 and (2) a second annulus 36 between sleeve 34 and housing 22. Sleeve 34 is closed at its lower end by plate 37 and at its upper end by filler cap 38, both of which are bolted in place and sealed by expensive indium seals 40. A filler tube 41 extends upward from cap 38 for a purpose described below. Cover 42 closes the top of housing 22 and is held in place by split ring 43. Conduit 44 extends upward from cover 42, and is sealed with relation to filler tube 42 by welding 42 and 44 at top to seal off the upper end of annulus 36 within housing 22. A one-way valve 45 provides fluid access to annulus 36 through which annulus 36 can be evacuated to create a high vacuum, insulative space around sleeve 34 to prevent excessive heat gains to chamber 23.

In operation, cryosonde 20 is prepared for use by pulling a high vacuum on annulus 36 which provides good insulation and protects the crystal prior to filling chamber 23 with freon and then flowing liquid nitrogen through filler tube 41 and into annulus 35 to freeze the freon solid. Cryosonde 20 is then assembled into tool 10 for a logging operation. The cryosonde will provide the necessary cooling for crystal 21 for up to 12 hours at 100° C. conditions and up to 24 hours at room temperatures before the freon temperature rises above the operational point and cryosonde has to be serviced.

Unfortunately, in prior art cryosondes such as that described above, chamber 23 is a very susceptible to rupture due to the internal pressure buildup caused by the freon "warming up" during a logging operation. Normally the pressure is vented through vent tube 33 but it has been found that the small diameter of tube 33 is easily stopped up by foreign particles which may come from (1) corrosion, (2) oxidation of the inside of copper chamber 23 during manufacture, (3) flux trapped in chamber 23 from the brazing operations, and (4) frozen water or oil droplets that may have been introduced from the freon supply. With vent tube 33 plugged and the temperature of the freon rising, it is not uncommon for the resulting pressure buildup in chamber 23 to rupture chamber 23 thereby making cryosonde inoperable.

In order to provide for this contingency, the prior art sondes had to be constructed so that chamber 23 was relatively easy to replace. This was done by bolting filler cap 38 and bottom plate 37 onto sleeve 34 and using Indium seals 40 therebetween. However, at the cryogenic temperatures at which a cryosonde has to operate, seals 40 routinely fail, resulting in the loss of the vacuum in annulus 35 which, in turn, causes rapid warm up of the cryosonde and potential damage to germanium crystal 21. When this occurs, it normally causes from several days to several weeks delay in the logging operation due to the necessary extensive repair of cryosonde 20.

In accordance with the present invention, a cryosonde is provided that overcomes many of the severe operational and maintenance problems encountered in presently known, prior art cryosondes of this type.

Referring now to FIG. 3, cryosonde 20a of the present invention is comprised of housing 20 having refrigerant chamber 23a therein. Chamber 23a is sealed at its lower end by copper, bottom cap 25a, which, in turn, has solid copper rod 27 extending downward therefrom and into contact with germanium crystal 21. Bottom cap 25a extends into the copper pipe (e.g., 0.25 inch) to seal chamber 23 without any machining of the lower wall of chamber 23 being required. A v-shaped groove (not shown) is formed where chamber 23 and cap 25a meet which, in turn is filled with silver brazing material that is actually stronger than the copper (i.e., chamber 23 and cap 25a) which is being joined. Also, any unbonded point within the overlap between the lower wall of chamber 23 and cap 25a is still as strong as the main wall of the chamber 23, thereby eliminating any weak points and preventing failure of chamber 23 at this point such as that previously experienced in prior art cryosondes.

Figure 4:
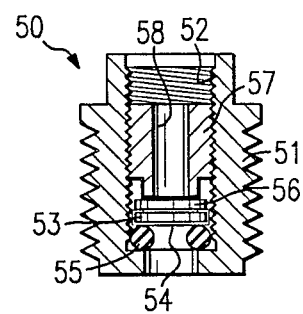
FIG. 4 is an enlarged sectional view of the rupture means used in the cryosonde of FIG. 3.

The upper end of chamber 23 is sealed with top cap 26a which, in turn, hs a defined rupture means 50 provided therein. Rupture 50 (FIG. 4) is preferably comprised of pipe plug 51 having a threaded bore 52 therethrough. Sealing membrane 54 (e.g., 0.0015 inch thick aluminum foil) is positioned between washer 53 and O-ring 55 in bore 52 and is held by a second washer 56, all of which are secured in bore 52 by screw 57 which, in turn, has bore 58 therethrough. It can be seen that excessive pressure buildup in chamber 23 will cause foil 54 to rupture and the freon under pressure will be relieved through bore 58 without any damage to chamber 23, itself. Rupture means 50 is positioned in cap 26a so that it is in a direct vertical line with fill tube 41 in filler cap 38a so that when foil 54 ruptures, a long-necked socket tool (not shown) can be easily inserted through fill tube 42 to unscrew and retrieve means 50. After foil 54 has been replaced, means 50 can then be easily replaced in cap 26a through tube 41. This is a quick and inexpensive procedure which requires a minimum of downtime as compared to that required to replace a rupture chamber in prior art cryosondes.

Further, in cryosonde 20a, the inside diameter of capillary tube 33a is substantially doubled while the outside diameter remains substantially the same as in the prior art sonde (FIG. 2). This not only makes tube 33a harder to plug, but the reduced metal in the walls of tube 33a reduces heat conduction to the interior of chamber 23a, thereby adding to the operation life of the frozen freon in chamber 23a. As still further protection against debris from plugging tube 33a, a porous stainless steel filter 55 (e.g., 50 micron filter, 2" long, ⅜ diameter) is installed at the entry of tube 33a into chamber 23a so that freon is filtered both as it flows into and out of chamber 23a. Filter 55 provides a surface area many times larger than the opening of tube 33a, making it extremely difficult to plug. Also, filter 55 prevents any large pieces of frozen freon from blocking tube 33a.

Since chamber 23a is not susceptible to rupture and since rupture means 50 is easily replaced without removing chamber 23a, filter cap 38a and bottom plate 37a can be permanently secured to sleeve 34a (e.g., by welding or the like) and seals 40 (FIG. 2) can be eliminated. This substantially reduces the possibility of vacuum loss from annulus 36 which, in turn, substantially extends the operational life of cryosonde 20a.

As can be seen from the above, the cryosonde of the present invention offers many improvements over known, prior art cryosondes which substantially increases its operational life and which substantially reduces the maintenance involved with such sondes.

What is claimed is:

1. A cryosonde comprising:
   a housing;
   a germanium crystal in said housing; and
   a means for cooling said crystal comprising:
   a refrigerant chamber in said housing in thermal communication with said crystal;
   means to fill said chamber with a refrigerant; and
   rupture means in communication with the interior of said chamber adapted to rupture at a pressure less than the pressure required to rupture said chamber.

2. The cryosonde of claim 1 wherein said rupture means comprises:
   a plug removable mounted in said chamber and having a bore therethrough fluidly communicating the interior and exterior of said chamber; and
   a replaceable sealing membrane covering said bore in said plug and adapted to rupture at a pressure less than the pressure required to rupture said chamber.

3. The cryosonde of claim 2 wherein said sealing membrane is comprised of aluminum foil.

4. The cryosonde of claim 2 incluing:
   a tube opening into said chamber for filling said chamber with refrigerant and for venting said chamber after filling; and
   a filter positioned over the opening of said tube whereby any fluid flowing into or out of said tube must flow through said filter.

5. The cryosonde of claim 2 including:
   a sleeve positioned between said chamber and said housing, said sleeve forming a first annulus between said sleeve and said housing and a second annulus between said sleeve and said housing;
   a filler cap closing the upper end of said sleeve;
   a cyrogenic filler tube through said filler cap for flowing a cryogenic fluid into said first annulus to freeze refrigerant in said chamber; and
   means to establish a vacuum in said second annulus.

6. The cryosonde of claim 5 wherein said rupture means on said chamber is positioned so that it can be removed and replaced through said filler tube.

* * * * *